Patented Sept. 6, 1932

1,875,920

UNITED STATES PATENT OFFICE

KENNETH GORDON AND JOSEPH HUGHES, OF NORTON-ON-TEES, ENGLAND, ASSIGNORS TO IMPERIAL CHEMICAL INDUSTRIES LIMITED, OF LONDON, ENGLAND, A BRITISH COMPANY

TREATMENT OF COAL DISTILLATION GASES

No Drawing. Application filed September 13, 1928, Serial No. 305,865, and in Great Britain October 17, 1927.

In view of the variety of constituents contained in coal distillation gases a large number of proposals have been made to apply such gases to industrial chemical synthesis. Thus it has been proposed to compress coke oven gas to 100–200 atmospheres and to wash the compressed gas successively with various washing agents, such as water, cuprous chloride solution (to remove carbon monoxide), tar oil (to remove benzol) and sulphuric acid (to remove ethylene and acetylene). In this known process it was further proposed to employ the residual gases, consisting of nitrogen and hydrogen, for the catalytic synthesis of ammonia, after removal of methane by low temperature cooling, e. g. by liquid air. It has also been proposed to fractionate coke oven gas by low temperature cooling sufficient to liquefy various constituents thereof.

We have now found a specially advantageous method of treating coal distillation gases which does not require low temperature cooling and which permits of what is for practical purposes a complete separation of the commercially valuable constituents of the gas in three principal steps. Our method consists in washing the compressed gas successively in three steps with various liquids adapted to remove firstly carbon dioxide and sulphur compounds, secondly carbon monoxide and unsaturated hydrocarbons, and thirdly saturated hydrocarbons such as methane, leaving a gaseous mixture comprising hydrogen and nitrogen which may be used for ammonia synthesis. Ammonia and preferably benzol may be removed before the high-pressure treatment of the gases. The invention includes such a process, defined more particularly in the description following, and further includes the features of regenerating the absorbed gases from the respective washing solutions and employing them in the production of valuable compounds.

The invention also includes the feature of employing waste gases from any of the processes mentioned, for supplying the heat required to distill the bituminous raw material.

In order that the invention may be properly understood, the various steps will now be set forth in detail, taking coke oven gas as an example of the initial gaseous material. The gas issuing from the coke ovens is washed with water and scrubbed with oil in the usual manner to remove the tar, ammonia and benzol, and the clean gas is then compressed to preferably 250 atmospheres. If desired the debenzolization can be effected under pressure.

Carbon dioxide, hydrogen sulphide, etc., are now removed by washing the gas with ammonia liquor (preferably a strong liquor, e. g. 25 per cent. by weight), and a gas is produced having approximately the following composition:

| | Per cent. by volume |
|---|---|
| Hydrogen | 55 |
| Methane and homologues | 30 |
| Unsaturated hydrocarbons | 2 |
| Carbon monoxide | 5 |
| Nitrogen | 8 |

This gas is treated in a tower with a washing solution of ammoniacal cuprous salt, such as formate, acetate or carbonate. This single washing solution removes from the gas practically the whole of the carbon monoxide and unsaturated hydrocarbons (principally ethylene), and the residual gas now comprises only hydrogen, nitrogen and methane and its homologues so that a further washing operation is not required to remove ethylene and acetylene.

This gas is now washed under pressure with a suitable high-boiling solvent, e. g. with paraffin (preferably kerosene) to remove the greater part of the methane, in a similar manner to that described in co-pending application Ser. No. 263,596. The washed gas consists practically entirely of hydrogen and nitrogen, with a small amount of methane. The ratio of hydrogen to nitrogen in the mixture is adjusted to 3:1 by addition of suitable gases, and the mixture is employed for the synthesis of ammonia. The small content of methane in the gas does not present any economic inconvenience.

The manner of dealing with the gases absorbed in the respective washing solutions may be as follows, and each of these processes now to be described forms, in conjunction with the main treatment of the coke oven gas, a part of the invention.

(1) The aqueous liquor formed in the removal of carbon dioxide and hydrogen sulphide may be utilized in a plant for making ammonium sulphate from gypsum and ammonium carbonate.

(2) The ammoniacal cuprous solution containing dissolved carbon monoxide and ethylene is regenerated, preferably by heating without releasing the pressure, and the gases driven off are collected and treated under pressure with a washing solution comprising silver nitrate, for the purpose of separating the carbon monoxide from the ethylene which is absorbed by the solution of silver nitrate as described in co-pending application Ser. No. 263,597. The carbon monoxide is unaffected by the silver nitrate solution and the washed gas therefore consists mainly of carbon monoxide together with some hydrogen, nitrogen and methane. This gas is utilized in any suitable way, e. g. for the manufacture of formates, formamide, hydrogen (by the well-known reaction with steam), or carbon (by catalytic decomposition).

The gas absorbed by the silver nitrate solution is recovered by heating and/or releasing the pressure, and the practically pure ethylene evolved is utilized as a raw material for making (by known processes) ethylene glycol, ethyl alcohol, or ethylene dichloride. The washing with silver nitrate solution may also be carried out at the ordinary pressure.

A particular advantage of this combination of processes whereby the ethylene is obtained in the practically pure state, resides in the fact that the gas to be dealt with in the second absorption is already concentrated in ethylene, since the gas driven off from the ammoniacal cuprous solution contains a much higher proportion of ethylene than does the original coke oven gas. Hence a smaller volume of silver nitrate solution can be used for absorption than could be used if it were required to remove ethylene from the raw gas.

(3) A gas consisting largely of methane (roughly 80 per cent.) is recovered by releasing the pressure of the organic scrubbing liquid used in the final purification step in the main process, when the liquid again enters the absorption system. The gas rich in methane, and containing in addition a certain amount of nitrogen and hydrogen is passed in known manner through an electric spark discharge so as to convert part of the methane into acetylene. The acetylene is removed from the gas by washing with a solution of mercurous sulphate in sulphuric acid, whereby it is converted into acetaldehyde, which is recovered and converted into acetic acid. The residual gas contains unconverted methane, hydrogen and nitrogen and may be recirculated through the arc or burnt to supply heat to the coke ovens.

If the methane-containing gas is circulated through the arc, it becomes continually enriched in hydrogen: when the methane content falls so low that the economy of the acetylene synthesis is affected, the gas may be purged from the system and sent back to the compressors, or to the methane removal plant after separate compression, to re-enter the main process.

In the foregoing main process it has been mentioned that the coke oven gas after debenzolization is compressed to 250 atmospheres. It is not, however, strictly necessary to compress the gas to this degree for the removal of carbon dioxide, hydrogen sulphide and carbon monoxide, since good results can be obtained by absorbing these gases at say 50 atmospheres. The removal of methane by paraffin scrubbing should however be carried out at the higher pressure, so that the main process could be operated by compressing the gas first to say 50 atmospheres, removing carbon dioxide, hydrogen sulphide, ethylene and carbon monoxide, and then compressing the residual gas to a high pressure, e. g. 250 atmospheres for the removal of methane. This variation of the process also comes within the scope of the invention.

In the case of the second absorption of the ethylene namely in the silver nitrate solution, a lower pressure may be used: even at atmospheric pressure good results are obtained. In all cases where is is desired to regenerate absorbed gases from solution, the release of the gases may be carried out in stages if thereby the gas collected at any stage should prove especially suitable in composition for any particular purpose in view.

For example, the gases absorbed by the cuprous solution are mainly ethylene and carbon monoxide; a large part of the ethylene may be recovered by releasing the pressure, while the bulk of the CO may be collected separately by heating the residual solution. (A step-by-step release of absorbed gas has been described by one of us in co-pending application Ser. No. 263,596.)

The removal of hydrogen sulphide and other sulphur compounds from the coke oven gas may also be effected in a dry way by means of the usual iron oxide process.

Detailed modification of the various combinations of processes hereinbefore described are intended to come within the scope of the invention.

While strong ammonia liquor is preferred for carrying out the first stage of the process, water may also be used.

In the appended claims by "removing the low pressure constituents" we intend to cover removal in suitable or known manner of tar, ammonia sulphur compounds (when these are removed by the iron oxide method and not by the ammonia liquor) and benzol (when this is removed at ordinary pressures).

We declare that what we claim is:

1. Process of treating coke oven and like gases which comprises removing the low pressure constituents, compressing the gas, washing it successively with ammonia liquor and ammoniacal cuprous solution, further compressing it and washing it with kerosene.

2. Process for treating coke oven and like gases which comprises removing the low pressure constituents, compressing the gas debenzolizing it under pressure, further compressing it, washing it successively with ammonia liquor and ammoniacal cuprous solution, further compressing it and washing it with kerosene.

3. Process of treating coke oven and like gases which comprises removing the low pressure constituents, compressing the gas, washing it with ammonia liquor, further compressing it washing it with ammoniacal cuprous solution, further compressing it and washing it with kerosene.

4. Process of treating coke oven and like gases which comprises removing the low pressure constituents, compressing the gas, debenzolizing it under pressure, further compressing it, washing it with ammonia liquor further compressing it, washing it with ammoniacal cuprous solution further compressing it, and washing it with kerosene.

5. Process of treating coke oven and like gases which comprises removing the low pressure constituents, compressing the gas to above 100 atmospheres pressure, preferably to 250 atmospheres and washing it successively in three steps with ammonia liquor, with ammoniacal cuprous solution and with kerosene.

6. Process of treating coke oven and like gas, which comprises removing the low pressure constituents, compressing the gas to about 50 atmospheres, washing it with ammonia liquor, and with ammoniacal cuprous solution, further compressing it to about 250 atmospheres, and washing with kerosene.

In witness whereof, we have hereunto signed our names this 29th day of July, 1929.

KENNETH GORDON.
JOSEPH HUGHES.